(12) United States Patent
Kuno et al.

(10) Patent No.: US 6,277,187 B1
(45) Date of Patent: Aug. 21, 2001

(54) FILM FOR CUTTING OFF HEAT RAYS AND A COATING LIQUID FOR FORMING THE SAME

(75) Inventors: Hiroko Kuno, Matsudo; Hiromitsu Takeda, Ichikawa; Kenji Adachi, Inzai, all of (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/167,990

(22) Filed: Oct. 8, 1998

(30) Foreign Application Priority Data

Mar. 16, 1998 (JP) .................................................. 10-064916

(51) Int. Cl.$^7$ ...................................................... C09C 1/36
(52) U.S. Cl. ................................ 106/287.16; 106/287.17; 106/287.18; 106/287.19; 106/436; 106/450; 106/453; 106/455; 106/462; 106/479
(58) Field of Search ........................ 106/287.16, 287.17, 106/287.18, 287.19, 436, 450, 453, 455, 462, 479

(56) References Cited

U.S. PATENT DOCUMENTS

| | | | | |
|---|---|---|---|---|
| 3,885,855 | * | 5/1975 | Gross | 428/427 |
| 3,929,674 | * | 12/1975 | Patterson | 252/514 |

FOREIGN PATENT DOCUMENTS 8325034   12/1996   (JP) .

* cited by examiner

*Primary Examiner*—D. S. Nakarani
(74) *Attorney, Agent, or Firm*—Dykema Gossett PLLC

(57) ABSTRACT

A film for cutting off heat rays having a high transmittance and a low reflectivity of visible light, a low transmittance and a high reflectivity of near infrared radiation and a surface resistivity of at least about $10^6$ ohms/square is formed from a coating liquid is a dispersion containing fine particles of borides having an average diameter not exceeding 100 nm. The liquid disperison is coated on a surface and heated. The dispersion may further contain fine particles of at least one ruthenium or iridium oxide having an average diameter not exceeding 100 nm.

12 Claims, 2 Drawing Sheets

FILM FOR CUTTING OFF HEAT RAYS AND A COATING LIQUID FOR FORMING THE SAME

BACKGROUND OF THE INVENTION

1. Field of the Invention

This invention relates to a film for cutting off the passage of heat rays through a transparent or semi-transparent material, such as glass or plastics, for e.g. the windows of vehicles, buildings, offices or houses, telephone booths, show windows, or lamps, and a coating liquid used for forming the same.

2. Description of the Prior Art

A sheet of glass having a film formed on its surface from a material reflecting visible and infrared wavelengths has been used as heat-ray reflecting glass for removing or reducing heat emitted by the sun, or an electric bulb, or any other source of light. The film has been formed from a material selected from among metal oxides such as FeOx, CoOx, CrOx and TiOx, and metals such as Ag, Au, Cu, Ni and Al.

These materials, however, not only reflect or absorb near-infrared radiation known as a source of heat, but also have a low transmittance of visible light. A transparent material used for buildings, vehicles, telephone booths, etc. are required to have a high transmittance of visible light. If any of the known materials as mentioned above is used for any such purpose, it has been necessary to form a very thin film, and it has been usual practice to employ a process, such as spraying and baking, CVD, sputtering or vacuum vapor deposition, to form a film having a very small thickness in the order of 10 nm.

These processes have, however, been unsatisfactory for a number of reasons including the necessity for a large apparatus, or vacuum equipment, low productivity, difficulty in forming a film covering a large area, and the expenditure of a large amount of cost.

Referring to the drawbacks of the films formed from the known materials, a film having a small thickness and thereby a high transmittance of light has a low property of cutting off heat rays, while a film is darkened if its thickness is sufficiently large to give it a high property of cutting off heat rays. A film having a high property of cutting off heat rays is also likely to have a high reflectivity of visible light and present a surface shining like a mirror and spoiled in appearance. Moreover, many of these materials give a film having a high electric conductivity which reflects radio waves and makes them unreceivable by a radio or television receiver, or a portable telephone, or causes the disturbance of waves in or around the structure in which the film is used.

These drawbacks can be overcome by a film having a low reflectivity of visible light and a high absorption or reflectivity of near infrared radiation, as well as a surface resistivity of or above about $10^6$ $\Omega/\square$. There has, however, not been known any such film, or any material suitable therefor.

Antimony tin oxide (ATO) and indium tin oxide (ITO) are known as materials having a high transmittance of visible light and a power of cutting off heat rays. These materials have a relatively low reflectivity of visible light and does not give a shining surface to a film, but as their plasma wavelengths fall in relatively long wavelengths in the near infrared region, a film formed from either material has been unsatisfactory in its property of reflecting or absorbing near infrared radiation close to visible light. Moreover, the film has been so high in electric conductivity as to reflect radio waves.

SUMMARY OF THE INVENTION

It is, therefore, an object of this invention to provide a film for cutting off heat rays which has a high transmittance and a low reflectivity of visible light, a low transmittance of near infrared radiation and a surface resistivity of or above about $10^6$ $\Omega/\square$. It is another object of this invention to provide a coating liquid which makes it possible to form any such film easily at a low cost even on a large surface.

We, the inventors of this inevntion, considered that it would be effective to use borides having a large quantity of free electrons, and as a result of our extensive research work, we have found as a basis for our invention that a film of high density formed from a dispersion of ultrafine particles of any such material has a maximum transmittance of light in the visible region, and a minimum transmittance in the near infrared region close to visible light.

According to this invention, there is provided a coating liquid which comprises a dispersion of fine particles of a boride of one or more metals selected from the group consisting of La, Pr, Nd, Ce, Gd, Tb, Dy, Ho, Y, Sm, Eu, Er, Tm, Yb, Lu, Sr, Ca, Ti, Zr, Hf, V, Nb, Ta, Cr, Mo and W, those particles having an average diameter not exceeding 100 nm.

The dispersion may also contain one or both of fine particles of ruthenium oxide and fine particles of iridium oxide, both having an average diameter not exceeding 100 nm.

In either event, the dispersion may also contain one or more of alkoxides of silicon, zirconium, titanium and aluminum, and partially polymerized products of those alkoxides.

The dispersion may further contain a resinous binder.

According to this invention, there is also provided a film formed on a base for cutting off heat rays by coating it with a coating liquid and heating it, the coating liquid comprising a dispersion prepared by dispersing fine particles of a boride of one or more metals selected from among La, Pr, Nd, Ce, Gd, Tb, Dy, Ho, Y, Sm, Eu, Er, Tm, Yb, Lu, Sr, Ca, Ti, Zr, Hf, V, Nb, Ta, Cr, Mo and W in a resinous binder, or a binder containing one or more metal oxides selected from among silicon, zirconium, titanium and aluminum oxides.

The film may be covered with an oxide film containing one or more metal oxides selected from among silicon, zirconium, titanium and aluminum oxides, or a resin film to form a multilayer film for cutting off heat rays.

In either event, the film has a maximum transmittance of light at a wavelength of 400 to 700 nm and a minimum transmittance at a wavelength of 700 to 1800 nm, and its maximum and minimum transmittances have a difference of 15 points or more in percentage. It also has a surface resistivity of $10^6$ $\Omega/\square$ or above. Therefore, the film of this invention does not have a shining surface, and has a high property of transmitting radio waves.

DETAILED DESCRIPTION OF THE INVENTION

Figure 1:
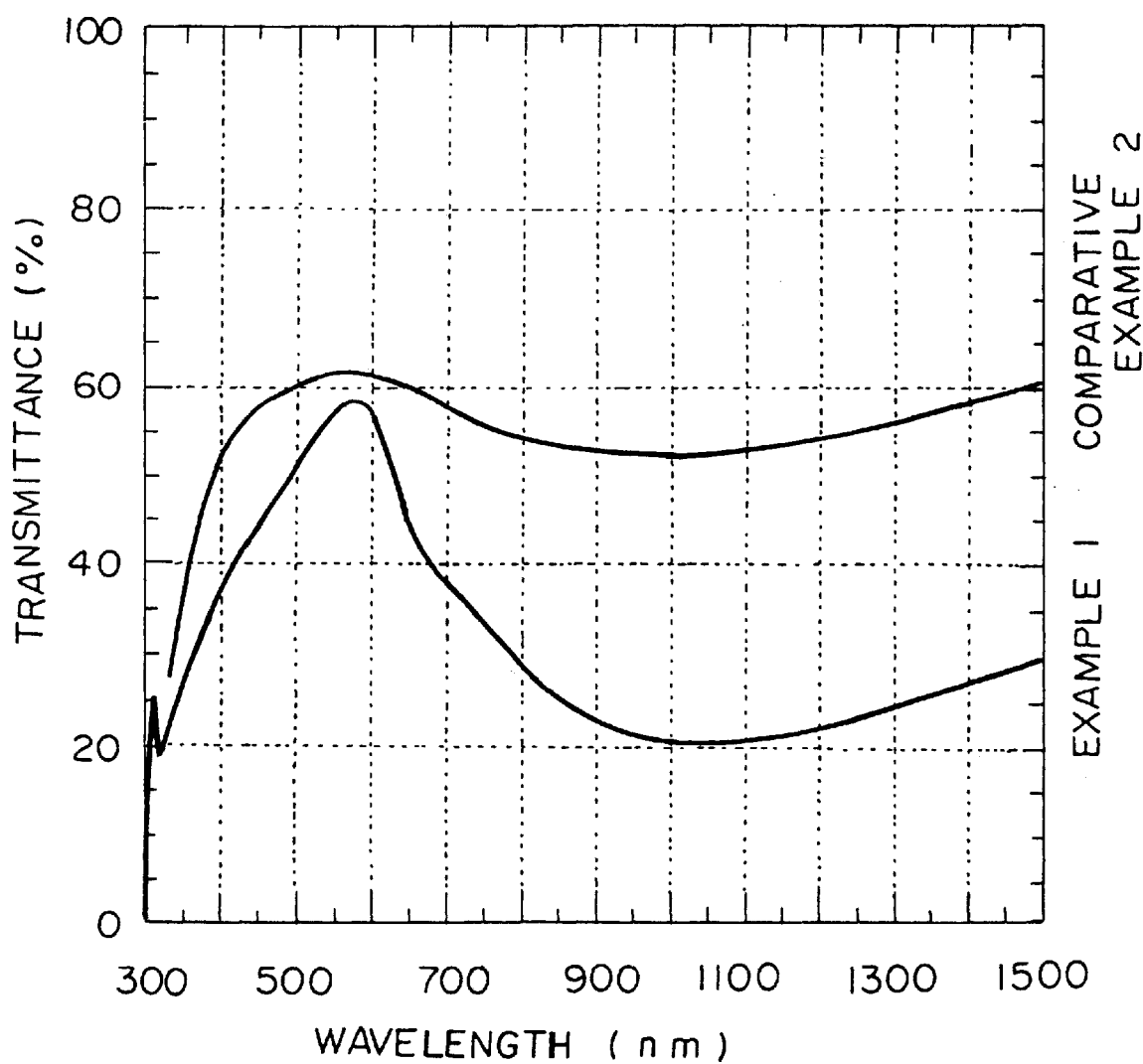
FIG. 1 is a graph showing the transmittance of the films according to Example 1 and Comparative Example 2 which will hereinafter be described.
Figure 2:
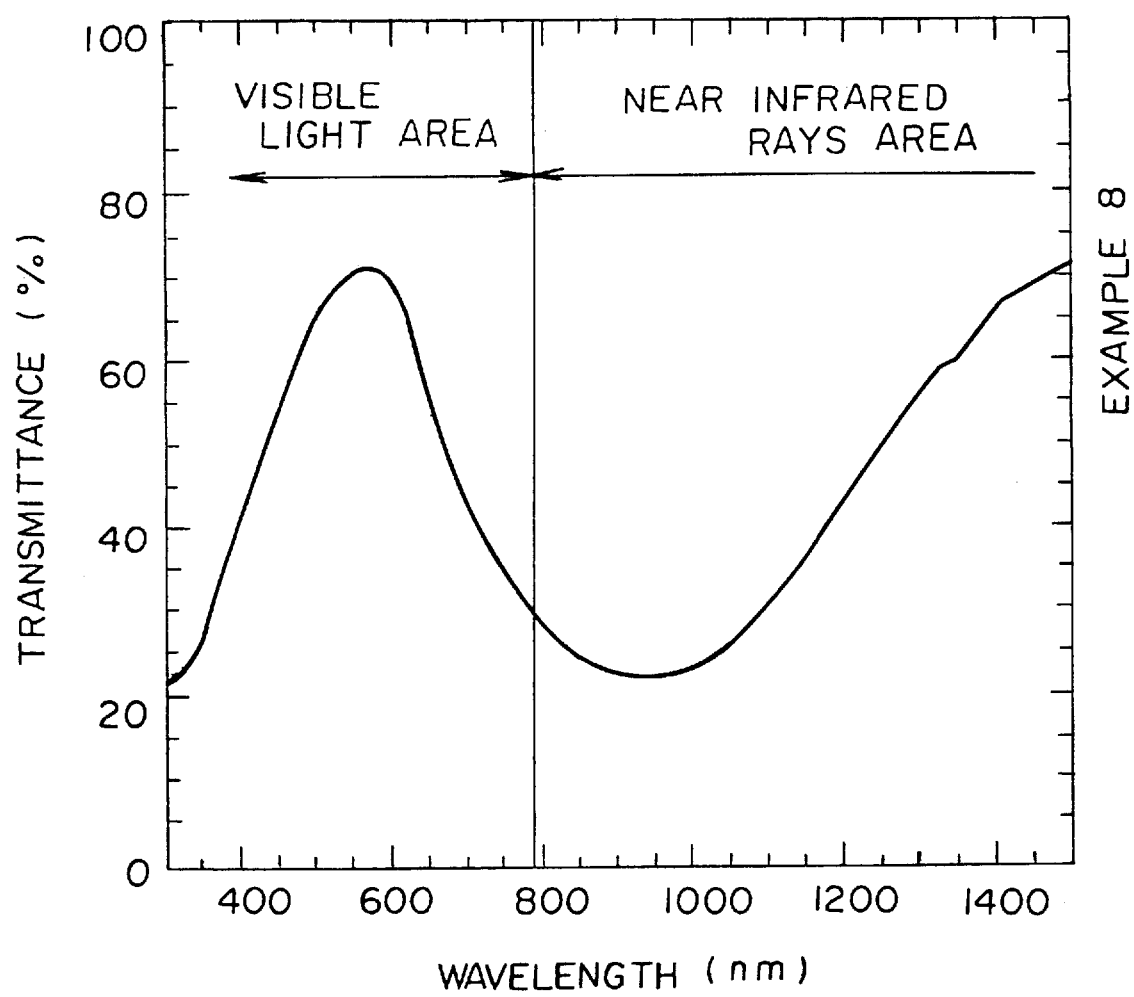
FIG. 2 is a graph showing the transmittance of the film according to Example 8.

The coating liquid of this invention contains fine particles of a metal boride, or borides, such as lanthanum boride ($LaB_6$), praseodymium boride ($PrB_6$), neodymium boride ($NdB_6$), cerium boride ($CeB_6$), gadrinium boride ($GdB_6$), terbium boride ($TbB_6$), dysprorium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calsium boride ($CaB_6$), titanium boride ($TiB_2$), zirconium boride ($ZrB_2$), hafnium boride ($HfB_2$), vanadium boride ($VB_2$), tantalum boride ($TaB_2$), chromium borides (CrB and $CrB_2$), molybdenum borides ($MoB_2$, $Mo_2B_5$ and MoB) and tungsten boride ($W_2B_5$).

Although it is preferable to use boride particles not having oxidized surfaces, it is usually the case that boride particles have slightly oxidized surfaces, or some oxidation may be unavoidable during the step of preparing a dispersion. In any such event, they are equally effective for cutting off heat rays. Although boride particles having a higher crystallinity may produce a greater effect of cutting off heat rays, even particles having so low a crystallinity as to reveal a very broad X-ray diffraction peak are effective for cutting off heat rays if the basic atomic bonds in the particles consist of boron and a metal.

The coating liquid of this invention may further contain fine particles of one or more ruthenium and iridium oxides, such as ruthenium dioxide ($RuO_2$), lead ruthenate ($Pb_2Ru_2O_{6.5}$), bismuth ruthenate ($Bi_2Ru_2O_7$), iridium dioxide ($IrO_2$), bismuth iradate ($Bi_2Ir_2O_7$) and lead iradate ($Pb_2Ir_2O_{6.5}$). These particles are stable as oxides, and have a large quantity of free electrons, and are, therefore, very effective for cutting off heat rays.

These boride and oxide particles have a grayish, brownish or greenish black color, but if their diameters are sufficiently small as compared with the visible wavelengths, a thin film in which they are dispersed transmits visible light. It, however, has a strong power of cutting off infrared radiation for some unclear reason. Probably because those particles have a large quantity of free electrons, they reflect or absorb heat rays selectively, as the free electron plasmons in and on the particles have a plasma frequency in the near infrared region close to visible light.

Experiments show that a film in which those particles having a sufficiently small diameter are uniformly dispersed has a maximum transmittance of light in a wavelength range of 400 to 700 nm and a minimum transmittance of light in a wavelength range of 700 to 1800 nm, and that its maximum and minimum transmittances have a difference of 15 points or more in percentage. Insofar as visible light has a wavelength of 380 to 780 nm, and as sensitivity of human eyes is expressed by a bell-shaped curve having a peak in the vicinity of 550 nm, it is obvious that such a film effectively transmits visible light and reflects or absorbs heat rays.

The boride and oxide particles preferably have an average diameter not exceeding 100 nm. If their average diameter exceeds 100 nm, they fail to form a film having a profile of transmittance as stated above, i.e., a profile having a maximum transmittance of light in a wavelength range of 400 to 700 nm and a minimum transmittance of light in a wavelength range of 700 to 1800 nm, with a difference of 15 points or more in percentage, is not obtained, and yields a grayish film having a monotonously decreased transmittance. Particles having an average diameter exceeding 100 nm are also likely to cohere or aggromerate and thereby tend to settle in the coating liquid. They, or coarse particles formed by their cohesion are also undesirable, since they serve as a source of scattering light and form a film having a haze, or lower its transmittance of visible light. Particles having a minimum diameter of, say, 2 nm are already economically available, though it is not the minimum diameter of the particles to be used for the purpose of this invention.

The particles may be dispersed in any medium that is suitable under the coating conditions or environment, or in view of the alkoxide, or synthetic resin binder employed. The dispersing medium may, for example, be water, or any of the organic solvents such as alcohols, ethers, esters or ketones, and an acid or alkali may be added to adjust the pH of the dispersion. The dispersion may further contain a surface active agent, or coupling agent which can further improve the stability of the particles dispersed therein. The amount of each additive may be up to 30%, and preferably up to 5%, by weight of the inorganic particles.

While the conduction of electricity in a film formed from the coating liquid takes place along a path formed by the particles contacting one another, it is possible to cut the path partly by varying, for example, the amount of the surface active, or coupling agent in the coating liquid, and it is thereby easy to lower the electric conductivity of the film so that it may have a surface resistivity of $10^6$ $\Omega/\square$ (or above. If the coating liquid further contains an alkoxide of silicon, zirconium, titanium or aluminum, or a partially polymerized product thereof, or a synthetic resin binder, the amount thereof can be altered to form a film having an adequately controlled electric conductivity.

The dispersion may be prepared by any method that can form a uniform dispersion, or by employing, for example, a bead, ball or sand mill, or an ultrasonic disperser.

The film of this invention is formed by the deposition of the boride (and oxide) particles with a high density on a substrate. If the coating liquid contains any alkoxide of silicon, zirconium, titanium or aluminum, any partially polymerized product thereof, or any synthetic resin binder, it is effective for improving the adhesion of the particles to the substrate and the hardness of the film. If the film is covered with a second layer containing an alkoxide of silicon, zirconium, titanium or aluminum, a partially polymerized product thereof, or a synthetic resin, it is possible to improve the adhesion of the film to the substrate and its hardness and weatherability to a still further extent.

If the coating liquid does not contain any alkoxide of silicon, zirconium, titanium or aluminum, any partially polymerized product thereof, or any synthetic resin binder, the film is composed solely of the boride (and oxide) particles deposited on the substrate. Although it is itself effective for cutting off heat rays, it is possible to reduce its haze and thereby improve its transmittance of visible light, as well as improving its adhesion to the substrate, if a second layer is formed on the film as a first layer by a second coating liquid containing an alkoxide of silicon, zirconium, titanium or aluminum, a partially polymerized product thereof, or a synthetic resin binder to form a multilayer film, since the second coating liquid fills the interstices of the particles in the first layer.

The second layer by which the first layer of the boride (and oxide) particles is firmly bonded to the substrate is easy to form at a low cost by coating, though it can also be formed by sputtering or vapor deposition. The second coating liquid may contain one or more of the alkoxides of silicon, zirconium, titanium and aluminum, and their partially polymerized products in water or alcohol, and preferably has an alkoxide, etc. content not exceeding 40% by weight in terms of the oxide formed by heating. An acid or alkali may be added to the coating liquid to adjust its pH as required. If the substrate is heated after the coating liquid has been applied onto the first layer to form the second layer, it is easy to form a film of an oxide of silicon, zirconium, titanium or aluminum.

Any method, such as spin, spray, dip, roll or flow coating, or screen printing, can be employed to apply the coating liquids if it can form a smooth and uniform film having a small thickness.

After the application of the second coating liquid, the substrate is preferably heated at a temperature of 100° C. or above, and more preferably at or above the boiling point of the solvent in the coating liquid. If its heating temperature is lower than 100° C., there is every likelihood that the alkoxide, or hydrolyzed polymerization product thereof may remain incompletely polymerized in the film, or that the solvent, such as water or an organic solvent, may remain unremoved in the film and lower its transmittance of visible light. If the coating liquid contains a synthetic resin binder, a method which is suitable for curing the resin may be applied to the layer. If it contains, for example, an ultraviolet-curing resin, the layer may be exposed to ultraviolet radiation, or if it contains a cold-setting resin, it is left to set. Thus, the coating liquid is applicable to any existing window glass, etc. at the site of the job, and is useful for a wide range of purposes.

An organosilazane solution can be used as a binder in the coating liquid of this invention, or as the second coating, or overcoating liquid. There is commercially available an organosilazane solution which has a polymerizing and curing temperature of 100° C. or below as a result of the modification of the group in the side chain, or the addition of an oxidizing catalyst, and which can be used to form a film at a considerably low temperature. A commercially available organo-silicate solutions can be used as a binder which is curable at room temperature. In either event, an inorganic film of $SiO_2$ is formed upon curing and is superior to a resin film in weatherability and strength.

The film of this invention in which the ultrafine particles are dispersed has a great advantage over any film formed by any physical film-forming process as mentioned before, since it does not reflect visible light so much as to present a shining surface, and exhibits a high absorption in the near infrared region. If it is desirable to restrain the reflection of visible light to a further extent, it is easily possible to form a multilayer film having a visible light reflectivity not exceeding 1% if a film having a low refractive index, such as of $SiO_2$ or MgF, is formed on the film of this invention.

The coating liquid of this invention may further contain ultrafine particles of, e.g., ATO, ITO or aluminum-containing zinc oxide to form a film having a still higher transmittance of visible light. The addition of these transparent ultrafine particles in a substantial amount makes it possible to form a film having a high absorbance of near infrared radiation close in wavelength to visible light and thereby a high transmittance of visible light. If the coating liquid of this invention is added to a dispersion of those particles, on the other hand, it colors a film of those particles and adds to its power of cutting off heat rays, even if it may be added only in a small amount, and its addition, therefore, makes it possible to reduce the use of ITO, etc., greatly and thereby prepare a dispersion thereof at a lower cost.

The coating liquid of this invention may also contain fine particles of one or more other substances including inorganic substances such as titanium, zinc and cerium oxides, and organic substances such as benzophenone and benzotriazole, to form a film having an improved power of cutting off ultraviolet radiation which is harmful to the human body, as well as an improved power of cutting off infrared radiation.

The coating liquid of this invention makes it possible to form a highly stable film of uniform thickness, since it is a dispersion of the inorganic fine particles as described, and does not rely upon the decomposition or chemical reaction of its components by the heat of baking for forming a film. A dispersion of an appropriate mixture of particles of inorganic substances makes it possible to form a film having a high power of cutting off heat rays. The film hardly undergoes any deterioration in color or function, even if it may, for example, be exposed to sunlight (among others, ultraviolet radiation), since the inorganic substances are by far higher in weatherability than the organic substances.

The invention will now be described more specifically based on examples embodying it and comparative examples.

EXAMPLE 1

8 g of fine particles of $LaB_6$ having an average diameter of 67 nm, 80 g of diacetone alcohol (DAA) and appropriate amounts of water and a dispersant were mixed for 100 hours in a ball mill containing zirconia balls having a diameter of 4 mm to prepare 100 g of a dispersion of $LaB_6$ (dispersion A). An ethyl silicate solution was prepared by mixing 6 g of Ethyl Silicate 40, product of Tama Chemical Industrial Co., Ltd. having an average polymerization degree of 4 to 5, 31 g of ethanol, 8 g of a 5% aqueous solution of hydrochloric acid and 5 g of water, and 50 g thereof, 800 g of water and 300 g of ethanol were thoroughly mixed and stirred to prepare 1, 150 g of a mixed ethyl silicate solution (solution B).

The dispersion A and the solution B were mixed and stirred in such proportions as to yield a coating liquid (liquid C) having a $LaB_6$ content of 1.0% and a $LaB_6/SiO_2$ ratio of 4/1. 15 g of liquid C was dropped from a beaker onto a sheet of soda-lime glass employed as a substrate, measuring 200 mm square by 3 mm thick and rotating at a speed of 145 rpm, and after three minutes, its rotation was stopped. The substrate was heated at 180° C. for 30 minutes in an electric furnace to have a film formed thereon as intended.

The spectral characteristics of the film were examined by using a Hitachi Limited spectrophotometer. FIG. 1 shows a profile of transmittance of light as exhibited by the film. It exhibited a maximum transmittance at a wavelength in the vicinity of 580 nm and a minimum transmittance in the vicinity of 1055 nm, and the values of its maximum and minimum transmittance had a difference of as large as 38 points. The calculation made in accordance with JIS-R-3106 gave a visible light transmittance of 54.6% as the net value for the film.

The light transmitted through the film presented a beautiful dark green color. The film had a visible light reflectivity of as low as 2.2% and did not present at all any shining surface like that of commercially available heat-ray reflecting glass.

The film had a surface resistivity of $10^6$ Ω/□ as measured by a Mitsubishi Chemical surface resistivity meter. It was sufficiently high to transmit radio waves quite satisfactorily.

COMPARATIVE EXAMPLE 1

Commercially available heat-ray reflecting bronze glass, on which a heat-ray reflecting film had been formed by an expensive physical film-forming process as mentioned before, was examined for its spectral transmittance at wavelengths of 340 to 1800 nm, and its transmittance of visible light was determined as 38.8% by calculation in accordance with JIS-R-3106. It had a visible light reflectivity of as high as 34.2% and presented a surface shining like a mirror. It had a surface resistivity of 83 Ω/□ which was obviously too low for the film to transmit radio waves satisfactorily.

EXAMPLE 2

The liquid C as obtained in Example 1 was used to form a first layer on sheet glass by spin coating, and after its spinning was continued for three minutes, 15 g of a silicate solution obtained by diluting the solution B with ethanol, and having a solid $SiO_2$ content of 0.9% was dropped from a beaker onto the glass to form a second layer, and after three minutes, its spinning was stopped. Then, the glass substrate was heated at 180° C. for 30 minutes in an electric furnace to have a two-layer film formed thereon as intended.

Example 1 was repeated for examining the spectral characteristis of the film. It had a transmittance of visible light raised to 56.2% and a reflectivity thereof lowered to 1.7%, as compared with the results of Example 1. The film had its reflectivity of visible light measured again after having a black tape bonded to its rear surface to eliminate any reflection of light thereon. It showed a reflectivity of 0.5% and presented a surface close to that of non-reflective glass.

It showed a maximum and a minimum transmittance substantially at the same wavelengths with the single-layer film according to Example 1, and was obviously comparable to it in its power of cutting off heat rays.

EXAMPLE 3

8 g of fine particles of $LaB_6$ having an average diameter of 67 nm, 80 g of isophorone and appropriate amounts of water and a dispersant were mixed by zirconia balls in a ball mill for 100 hours to prepare 100 g of an isophorone dispersion of $LaB_6$ (dispersion D). An epoxy resin was dissolved in isophorone to prepare a binder solution containing 50% by weight of epoxy resin (solution E). The dispersion D, solution E and ethanol were strongly mixed and stirred to prepare a coating liquid having a solid $LaB_6$ and epoxy resin content of 1.4% by weight and a $LaB_6$/epoxy resin ratio by weight of 70/30. Example 1 was repeated for forming a film.

EXAMPLE 4

A coating liquid was prepared by using a Shinetsu Silicone cold-setting silicate solution, X-40-9740, as a binder instead of solution B and otherwise repeating Example 1. A film was formed by leaving the coating liquid at a room temperature of 25° C. for two days to dry on a substrate instead of heating it, and otherwise repeating Example 1.

EXAMPLE 5

A coating liquid having a $LaB_6$ content of 1.0% and a $LaB_6/SiO_2$ ratio of 4/1 was prepared by using a cold-setting polyperhydrosilazane solution of NE Chemcat Co., Ltd. as a binder instead of solution E, mixing and stirring it, the dispersion D and xylene, and otherwise repeating Example 3. A film was formed by heating the substrate at 80° C. and otherwise repeating Example 1.

EXAMPLE 6

A coating liquid was prepared by using fine particles of $PrB_6$ having an average diameter of 75 nm instead of $LaB_6$ to prepare the dispersion A and otherwise repeating Example 1, and was used to form a film by repeating Example 1.

EXAMPLE 7–21

A coating liquid was prepared by using fine particles of X having an average diamter of Y nm instead of $LaB_6$ to prepare the dispersion A and otherwise repeating Example 1, and was used to form a film by repeating Example 1.

|  | X | Y |
|---|---|---|
| Example 7 | $NdB_6$ | 49 |
| Example 8 | $CeB_6$ | 61 |
| Example 9 | $GdB_6$ | 30 |
| Example 10 | $TbB_6$ | 67 |
| Example 11 | $DyB_6$ | 83 |
| Example 12 | $HoB_6$ | 77 |
| Example 13 | $YB_6$ | 48 |
| Example 14 | $SmB_6$ | 69 |
| Example 15 | $EuB_6$ | 41 |
| Example 16 | $ErB_6$ | 35 |
| Example 17 | $TmB_6$ | 56 |
| Example 18 | $YbB_6$ | 82 |
| Example 19 | $LuB_6$ | 53 |
| Example 20 | $SrB_6$ | 68 |
| Example 21 | $CaB_6$ | 82 |

EXAMPLE 22

A coating liquid was prepared by using fine particles of $TiB_2$ having an average diameter of 84 nm instead of $LaB_6$ to prepare the dispersion A and otherwise repeating Example 1, and was used to form a film by repeating Example 1.

EXAMPLE 23

A coating liquid was prepared by using fine particles of $TaB_2$ having an average diameter of 63 nm instead of $LaB_6$ to prepare the dispersion A and otherwise repeating Example 1, and was used to form a film by repeating Example 1.

EXAMPLE 24

A coating liquid was prepared by using fine particles of MoB having an average diameter of 59 nm instead of $LaB_6$ to prepare the dispersion A and otherwise repeating Example 1, and was used to form a film by repeating Example 1.

EXAMPLE 25

A coating liquid was prepared by using fine particles of $W_2B_5$ having an average diameter of 85 nm instead of $LaB_6$ to prepare the dispersion A and otherwise repeating Example 1, and was used to form a film by repeating Example 1.

EXAMPLE 26

15 g of fine particles of ruthenium oxide ($RuO_2$) having an average diameter of 30 nm, 23 g of N-methyl-2-pyrrolidone (NMP), 57 g of diacetone alcohol and appropriate amounts of water and a dispersant were mixed for 100 hours in a ball mill by using zirconia balls having a diameter of 4 mm to prepare 100 g of a dispersion of $RuO_2$. This dispersion and the silicate solution B (Example 1) were mixed and stirred to prepare a silicate solution (solution F) containing $RuO_2$ dispersed therein at a concentration of 1% and having a $RuO_2/SiO_2$ ratio of 4/1. The dispersion A (Example 1) and the solution F were thoroughly mixed and stirred to prepare a coating liquid containing $RuO_2$ and $LaB_6$ at a ratio by weight of 1:1. The coating liquid was used to form a film by repeating Example 1.

EXAMPLE 27

A coating liquid containing a mixture of $IrO_2$ and $LaB_6$ dispersed in a silicate solution was prepared by using fine particles of $IrO_2$ having an average diameter of 28 nm and otherwise repeating Example 11, and was used to form a film.

In Examples 1 to 12, as well as Comparative Examples 1 to 3, the transmittance and surface resistivity of the film were determined by repeating Example 1. The results, including those of Examples 1 and 2, are shown in Table 1 below. As is obvious from Table 1, all of the films according to Examples 1 to 12 of this invention have a maximum transmittance of visible light at a wavelength of 400 to 700 nm and a minimum transmittance at a wavelength of 700 to 1800 nm with a difference of more than 15 points in percentage therebetween, and are useful for cutting off heat rays. They all have a reflectivity of visible light not exceeding 8% and present a surface not shining like a mirror. Moreover, they all have a surface resistivity higher than $8 \times 10^{10}$ $\Omega/\square$ and transmit radio waves satisfactorily.

EXAMPLE 28

35 g of fine particles of ITO having an average diameter of 55 nm, 61 g of diacetone alcohol (DAA) and 4.0 g of a coupling agent for dispersing the fine particles were mixed for twelve hours in a ball mill by using zirconia balls in a ball mill to prepare 100 g of a dispersant of ITO fine particles (solution C). The solution C, the dispersion A disclosed in Example 1 and silicon based UV curing resin produced by Shin-Etsu Silicon Co., Ltd. were thoroughly mixed while diluting with ethanol to prepare a solution having the composition as shown by Example 20 in Table 1. 15 g of the thus prepared solution was dropped from a beaker onto a sheet of soda-glass employed as a substrate, measuring 200 mm square by 3 mm thick and rotating at a speed of 200 rpm and after five minutes, its rotation was stopped. The resultatn substrate was heated at 100° C. for 2 minutes in an electric furnance to evaporate the solvent and, then, subjected to a ultraviolet irradiation for two minutes by using a high-pressure mercury lamp to obtain an aimed film. The optical characteristics of the thus obtained film are shown in Table 1.

EXAMPLE 29

35 g of fine particles of ATO having an average diameter of 50 nm, 61 g of diacetone alcohol (DAA) and 4.0 g of a coupling agent for dispersing the fine particles were mixed for twelve hours in a ball mill by using zirconia balls in a ball mill to prepare 100 g of a dispersant of ATO fine particles (solution D). The solution D, the dispersion A disclosed in Example 1 and silicon-based UV curing resin produced by Shin-Etsu Silicon Co., Ltd. were thoroughly mixed while diluting with ethanol to prepare a solution having the composition as shown by Example 20 in Table 1. 15 g of the thus prepared solution was dropped from a beaker onto a sheet of soda-glass employed as a substrate, measuring200 mm square by 3 mm thick and rotating at a speed of 200 rpm and after five minutes, its rotation was stopped. The resultant substrate was heated at 100° C. for 2 minutes in an electric furnance to evaporate the solvent and, then, subjected to a ultraviolet irradiation for two minutes by using a high-pressure mercury lamp to obtain an aimed film. The optical characteristics of the thus obtained film are shown in Table 1.

COMPARATIVE EXAMPLE 2

A coating liquid containing $LaB_6$ dispersed in a silicate solution was prepared by using $LaB_6$ having an average particle diameter of 137 nm and otherwise repeating Example 1, and was used to form a film by repeating Example 1. The particles were, however, so large that the film had a haze of 28%, lacked transparency, and was slightly greenish gray. Moreover, it had a difference of as small as 12% between its maximum and minimum transmittances, and was considered difficult to use for cutting off heat rays.

COMPARATIVE EXAMPLE 3

A coating liquid containing ITO dispersed in a silicate solution was prepared by using ultrafine particles of ITO having an average diameter of 22 nm and otherwise repeating Example 1, and was used to form a film by repeating Example 1. The film, however, showed a transmittance of over 90% from visible light to an infrared wavelength of 1500 nm, and these results taught that a film containing only 1% of ITO was useless for cutting off near infrared radiation.

TABLE 1

| EXAMPLE | Dispersed fine particles | Binder | Overcoat layer | Visible light transmittance (%) | maximum transmittance wavelength (nm) | minimum transmittance wavelength (nm) | Difference between maximum and minimum (points) | Surface resistivity ($\Omega/\square$) |
|---|---|---|---|---|---|---|---|---|
| 1 | $LaB_6$ | Silicate | None | 54.6 | 580 | 1055 | 38 | $3.2 \times 10^{11}$ |
| 2 | $LaB_6$ | Silicate | Silicate | 56.2 | 584 | 1060 | 34 | $9.5 \times 10^{11}$ |
| 3 | $LaB_6$ | Epoxy resin | None | 48.1 | 575 | 1039 | 23 | $6.5 \times 10^{11}$ |
| 4 | $LaB_6$ | Cold-setting Silicate | None | 51.3 | 587 | 1104 | 32 | $1.4 \times 10^{12}$ |
| 5 | $LaB_6$ | Silazane | None | 51.9 | 576 | 1033 | 42 | $2.2 \times 10^{11}$ |
| 6 | $PrB_6$ | Silicate | None | 55.7 | 594 | 1108 | 26 | $6.4 \times 10^{11}$ |
| 7 | $NdB_6$ | Silicate | None | 62.1 | 573 | 1060 | 42.8 | $4.5 \times 10^{11}$ |
| 8 | $CeB_6$ | Silicate | None | 68.5 | 575 | 1075 | 49.5 | $8.4 \times 10^{10}$ |
| 9 | $GdB_6$ | Silicate | None | 68.1 | 596 | 1104 | 32.3 | $2.6 \times 10^{11}$ |
| 10 | $TbB_6$ | Silicate | None | 54.0 | 589 | 1109 | 31.2 | $3.3 \times 10^{11}$ |

TABLE 1-continued

| EXAMPLE | Dispersed fine particles | Binder | Overcoat layer | Visible light transmittance (%) | maximum transmittance wavelength (nm) | minimum transmittance wavelength (nm) | Difference between maximum and minimum (points) | Surface resistivity (Ω/□) |
|---|---|---|---|---|---|---|---|---|
| 11 | $DyB_6$ | Silicate | None | 65.8 | 578 | 1095 | 33.0 | $9.7 \times 10^{10}$ |
| 12 | $HoB_6$ | Silicate | None | 48.7 | 588 | 1094 | 29.4 | $7.8 \times 10^{11}$ |
| 13 | $YB_6$ | Silicate | None | 76.3 | 589 | 1102 | 47.5 | $4.5 \times 10^{11}$ |
| 14 | $SmB_6$ | Silicate | None | 56.5 | 591 | 1084 | 33.7 | $7.3 \times 10^{11}$ |
| 15 | $EuB_6$ | Silicate | None | 54.2 | 587 | 1098 | 30.5 | $2.2 \times 10^{12}$ |
| 16 | $ErB_6$ | Silicate | None | 50.9 | 593 | 1115 | 33.3 | $9.2 \times 10^{11}$ |
| 17 | $TmB_6$ | Silicate | None | 46.0 | 586 | 1112 | 30.2 | $8.5 \times 10^{11}$ |
| 18 | $YbB_6$ | Silicate | None | 63.8 | 583 | 1091 | 31.2 | $4.3 \times 10^{12}$ |
| 19 | $LuB_6$ | Silicate | None | 64.3 | 593 | 1100 | 35.2 | $9.6 \times 10^{11}$ |
| 20 | $SrB_6$ | Silicate | None | 77.2 | 605 | 1125 | 25.6 | $9.9 \times 10^{12}$ |
| 21 | $CaB_6$ | Silicate | None | 78.2 | 599 | 1116 | 24.3 | $8.8 \times 10^{12}$ |
| 22 | $TiB_2$ | Silicate | None | 63.4 | 493 | 986 | 29 | $2.5 \times 10^{11}$ |
| 23 | $TaB_2$ | Silicate | None | 52.8 | 608 | 1104 | 24 | $2.5 \times 10^{12}$ |
| 24 | MoB | Silicate | None | 49.6 | 456 | 978 | 28 | $8.4 \times 10^{10}$ |
| 25 | $W_2B_5$ | Silicate | None | 58.2 | 591 | 1071 | 23 | $5.3 \times 10^{11}$ |
| 26 | $LaB_6 + RuO_2$ | Silicate | None | 64.3 | 583 | 1034 | 31 | $7.8 \times 10^{11}$ |
| 27 | $LaB_6 + IrO_2$ | Silicate | None | 62.5 | 589 | 1046 | 30 | $8.6 \times 10^{11}$ |
| 28 | $CeB_6 + ITO$ | Silicate | None | 70.5 | 570 | 1800 | 66.0 | $7.6 \times 10^{11}$ |
| 29 | $CeB_6 + ATO$ | Silicate | None | 67.3 | 573 | 1800 | 62.0 | $9.8 \times 10^{11}$ |
| COMPARATIVE EXAMPLE 1 | — | — | None | 38.8 | 640 | 1000 | 8 | 83 |
| COMPARATIVE EXAMPLE 2 | $LaB_6$ | Silicate | None | 61.7 | 572 | 1024 | 12 | $5.8 \times 10^{11}$ |
| COMPARATIVE EXAMPLE 3 | ITO | Silicate | None | 93.5 | — | — | — | $8.3 \times 10^3$ |

What is claimed is:

1. A coating liquid for forming a film for cutting off heat rays which comprises a dispersion containing fine particles of boride having an average diameter of 100 nm at most.

2. A coating liquid as set forth in claim 1, wherein said dispersion further contains fine particles of at least one of ruthenium and iridium oxides having an average diameter of 100 nm at most.

3. A coating liquid as set forth in claim 1 or 2, wherein said dispersion further contains at least one oxide selected from the group consisting of indium tin oxide (ITO), antimony tin oxide (ATO), and aluminium zinc oxide (AZO).

4. A coating liquid as set forth in claim 1, wherein said boride is selected from the group consisting of lanthanum boride ($LaB_6$), praseodymium boride ($PrB_6$), neodymium boride ($NdB_6$), cerium boride ($CeB_6$), gadrinium boride ($GdB_6$), terbium boride ($TbB_6$), dysproriumboride ($DyB_6$), holmiumboride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetiumboride ($LuB_6$), strontiumboride ($SrB_6$), calsium boride ($CaB_6$), titanium boride ($TiB_2$), zirconium boride ($ZrB_2$), hafnium boride ($HfB_2$), vanadium boride ($VB_2$), tantalum boride ($TaB_2$), chromium borides (CrB and $CrB_2$), molybdenum borides ($MoB_2$, $MO_2B_5$ and MoB) and tungsten boride ($W_2B_5$), said particles having an average diameter of 100 nm at most.

5. A coating liquid as set forth in claim 2, wherein said boride is selected from the group consisting of lanthanum boride ($LaB_6$), praseodymium boride ($PrB_6$), neodymium boride ($NdB_6$), cerium boride ($CeB_6$), gadrinium boride ($GdB_6$), terbium boride ($TbB_6$), dysproriumboride ($DyB_6$), holmiumboride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calsium boride ($CaB_6$), titanium boride ($TiB_2$), zirconium boride ($ZrB_2$), hafnium boride ($HfB_2$), vanadium boride ($VB_2$), tantalum boride ($TaB_2$), chromium borides (CrB and $CrB_2$), molybdenum borides ($MoB_2$, $MO_2B_5$ and MoB) and tungsten boride ($W_2B_5$), said particles having an average diameter of 100 nm at most.

6. A coating liquid as set forth in claim 2, wherein said ruthenium oxide is selected from the group consisting of ruthenium dioxide ($RuO_2$), lead ruthenate ($Pb_2Ru_2O_{6.5}$) and bismuth ruthenate ($Bi_2Ru_2O_7$).

7. A coating liquid as set forth in claim 3, wherein said boride is selected from the group consisting of lanthanum boride ($LaB_6$), praseodymium boride ($PrB_6$), neodymium boride ($NdB_6$), cerium boride ($CeB_6$), gadrinium boride ($GdB_6$), terbium boride ($TbB_6$), dysprorium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calsium boride ($CaB_6$), titanium boride ($TiB_2$), zirconium boride ($ZrB_2$), hafnium boride ($HfB_2$), vanadium boride ($VB_2$), tantalum boride ($TaB_2$), chromium borides (CrB and $CrB_2$), molybdenum borides ($MoB_2$, $MO_2B_5$ and MoB) and tungsten boride ($W_2B_5$), said particles having an average diameter of 100 nm at most.

8. A coating liquid as set forth in claim 1 or 2, wherein said ruthenium oxide is selected from the group consisting of ruthenium dioxide ($RuO_2$), lead ruthenate ($Pb_2Ru_2O_{6.5}$) and bismuth ruthenate ($Bi_2Ru_2O_7$).

9. A coating liquid as set forth in claim 1 or 2, wherein said dispersion further contains at least one compound selected from the group consisting of alkoxides of silicon, zirconium, titanium and aluminum, and partially polymerized products of said alkoxides.

10. A coating liquid as set forth in claim 9, wherein said compound in terms of oxide occupies at most 40% by weight of the liquid.

11. A coating liquid as set forth in claim 1 or 2, wherein said dispersion contains a resinous binder.

12. A coating liquid as set forth in claim 1 or 2, wherein said dispersion is prepared by dispersing said particles in said binder uniformly by using a bead, ball or sand mill, or an ultrasonic disperser.

* * * * *